US009002101B2

(12) United States Patent
Nakai et al.

(10) Patent No.: US 9,002,101 B2
(45) Date of Patent: Apr. 7, 2015

(54) RECOGNITION DEVICE, RECOGNITION METHOD, AND COMPUTER PROGRAM PRODUCT

(75) Inventors: Tomohiro Nakai, Kanagawa (JP); Toshimitsu Kaneko, Kanagawa (JP); Susumu Kubota, Tokyo (JP); Satoshi Ito, Kanagawa (JP); Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 13/420,833

(22) Filed: Mar. 15, 2012

(65) Prior Publication Data
US 2012/0243779 A1    Sep. 27, 2012

(30) Foreign Application Priority Data
Mar. 25, 2011  (JP) .................................. 2011-067398

(51) Int. Cl.
*G06K 9/00*       (2006.01)
*G06K 9/62*       (2006.01)

(52) U.S. Cl.
CPC ................ *G06K 9/6256* (2013.01); *G06K 9/00* (2013.01); *G06K 9/6262* (2013.01)

(58) Field of Classification Search
CPC ............ G06K 9/00288; G06K 9/6232; G06K 9/6218; G06K 9/3241; G06K 9/00523; G06K 2209/23; G06K 9/00087; G06K 9/6292; G06K 9/6267; G06K 9/00456; G06K 9/6269; G06K 9/6256; G06K 9/6262; G06K 9/6228; G06K 9/6255; G06K 9/6276; G01N 15/1475; A61J 3/00; A61J 7/0084; G06N 99/005; G06N 3/08; H04L 41/5009
USPC .............. 382/159, 180, 190, 228; 706/20, 12; 434/322
See application file for complete search history.

(56) References Cited

U.S. PATENT DOCUMENTS 5,086,479 A  *  2/1992  Takenaga et al. ............. 382/157
5,287,275 A  *  2/1994  Kimura .................................. 1/1
(Continued)

FOREIGN PATENT DOCUMENTS

| JP | 2002-073076 | 3/2002 |
|---|---|---|
| JP | 2002-150221 | 5/2002 |

(Continued)

OTHER PUBLICATIONS

Shibata, Tomoyuki, et al; "Large Margin Discriminant Hashing for Fast k-Nearest neighbor Classification", 2010 International Conference on Pattern Recognition, IEEE, pp. 1015-1018.

*Primary Examiner* — Vu Le
*Assistant Examiner* — Aklilu Woldemariam
(74) *Attorney, Agent, or Firm* — Amin, Turocy & Watson, LLP

(57) ABSTRACT

According to an embodiment, a recognition device includes a generation unit to select, plural times, groups each including learning samples from a storage unit, learn a classification metric for classifying the groups selected in each selection, and generate an evaluation metric including the classification metrics; a transformation unit to transform a first feature value of an image including an object into a second feature value using the evaluation metric; a calculation unit to calculate similarities of the object to categories in a table using the second feature value and reference feature values; and a registration unit to register the second feature value as the reference feature value in the table associated with the category of the object and register the first feature value as the learning sample belonging to the category of the object in the storage unit. The generation unit performs the generation again.

7 Claims, 9 Drawing Sheets

(56) References Cited

U.S. PATENT DOCUMENTS

| | | | |
|---|---|---|---|
| 5,479,570 A | 12/1995 | Imagawa et al. | |
| 5,497,448 A * | 3/1996 | Maruno et al. | 706/20 |
| 5,703,964 A * | 12/1997 | Menon et al. | 382/228 |
| 5,937,093 A * | 8/1999 | Takahashi | 382/226 |
| 6,647,139 B1 * | 11/2003 | Kunii et al. | 382/159 |
| 7,120,292 B2 * | 10/2006 | Kunii et al. | 382/159 |
| 7,149,356 B2 * | 12/2006 | Clark et al. | 382/209 |
| 7,853,052 B2 * | 12/2010 | Yanagawa et al. | 382/118 |
| 2004/0042665 A1 * | 3/2004 | Il et al. | 382/225 |
| 2004/0052413 A1 * | 3/2004 | Kunii et al. | 382/159 |
| 2004/0066970 A1 * | 4/2004 | Matsugu | 382/217 |
| 2004/0071346 A1 * | 4/2004 | Clark et al. | 382/209 |
| 2005/0078869 A1 * | 4/2005 | Kim | 382/190 |
| 2005/0084155 A1 * | 4/2005 | Yumoto et al. | 382/190 |
| 2006/0064017 A1 * | 3/2006 | Krishnan et al. | 600/450 |
| 2007/0127786 A1 * | 6/2007 | Hiraizumi et al. | 382/118 |
| 2007/0147683 A1 * | 6/2007 | Hwang et al. | 382/190 |
| 2008/0304755 A1 * | 12/2008 | Xiao et al. | 382/225 |
| 2009/0041340 A1 * | 2/2009 | Suzuki et al. | 382/159 |
| 2012/0052473 A1 | 3/2012 | Kozakaya | |
| 2012/0246099 A1 | 9/2012 | Kawahara et al. | |

FOREIGN PATENT DOCUMENTS

| | | |
|---|---|---|
| JP | 2005-309535 | 11/2005 |
| JP | 2010-157154 | 7/2010 |
| JP | 2010-165053 | 7/2010 |

* cited by examiner

FEATURE VECTOR X ⟶ EVALUATION METRIC $\{F_1(x), F_2(x), ..., F_N(x)\}$

FEATURE VALUE $v(X) = \{s_1, s_2, ..., s_N\}$

| REFERENCE FEATURE VALUE | CATEGORY |
|---|---|
| $(a_{11}, a_{12}, ···, a_{1N})$ | A |
| $(a_{21}, a_{22}, ···, a_{2N})$ | A |
| $(b_{11}, b_{12}, ···, b_{1N})$ | B |
| ⋮ | ⋮ |

FIG.5

| ORDER | CANDIDATES | | SIMILARITY |
|---|---|---|---|
| 1 👑 | | DONUT | 1.000 |
| | | BACON EGG | 0.000 |
| | | SOUTHERN-STYLE CHICKEN | 0.000 |
| | | CREAM MELON | 0.000 |
| | | CREAM FILLED BREAD | 0.000 |

RECOGNITION OF PHOTOGRAPHED IMAGE

CONFIRMATION OF CANDIDATE

REGISTRATION OF NEW CATEGORY

FIG.9

| REFERENCE FEATURE VALUE | CATEGORY |
|---|---|
| $(a_{11}, a_{12}, \cdots, a_{1N})$ | A |
| $(a_{21}, a_{22}, \cdots, a_{2N})$ | A |
| $(b_{11}, b_{12}, \cdots, b_{1N})$ | B |
| $(c_{11}, c_{12}, \cdots, c_{1N})$ | C |
| ⋮ | ⋮ |

FIG.10

REGENERATION CONDITION SETTING SCREEN

- ☑ NUMBER OF TIMES OF ADDITIONAL LEARNING AFTER LEARNING OR RE-LEARNING — 100 TIMES
- ☐ TIME THAT HAS ELAPSED AFTER LEANING OR RE-LEARNING — TIME
- ☐ RECOGNITION ERROR RATE — %
- ☐ NUMBER OF REFERENCE FEATURE VALUES — UNITS
- ☐ NUMBER OF LEARNING SAMPLES — UNITS
- ☐ VARIANCE OF REFERENCE FEATURE VALUES
- ☐ VARIANCE OF LEARNING SAMPLES

OK ~221    CANCEL

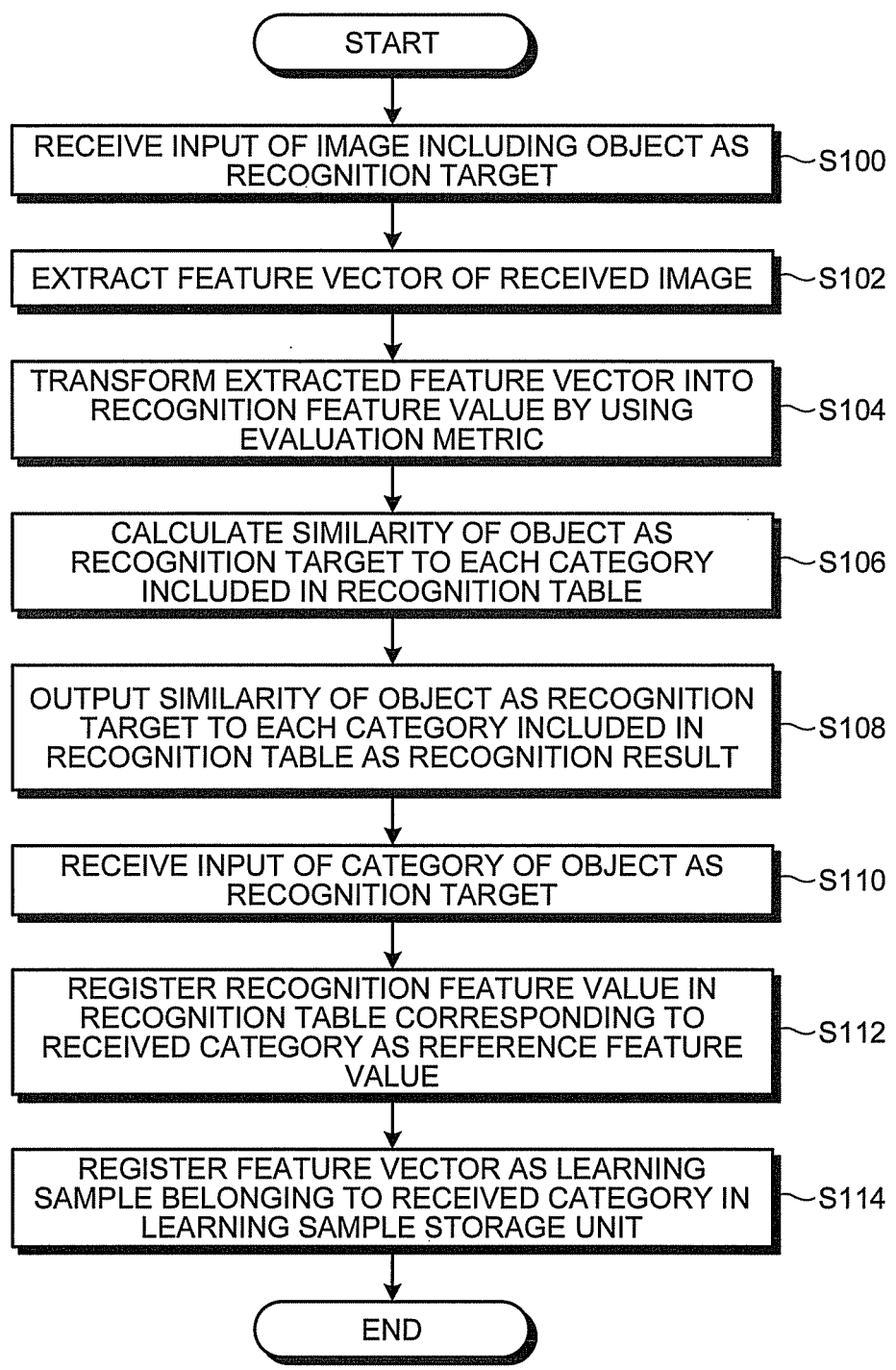

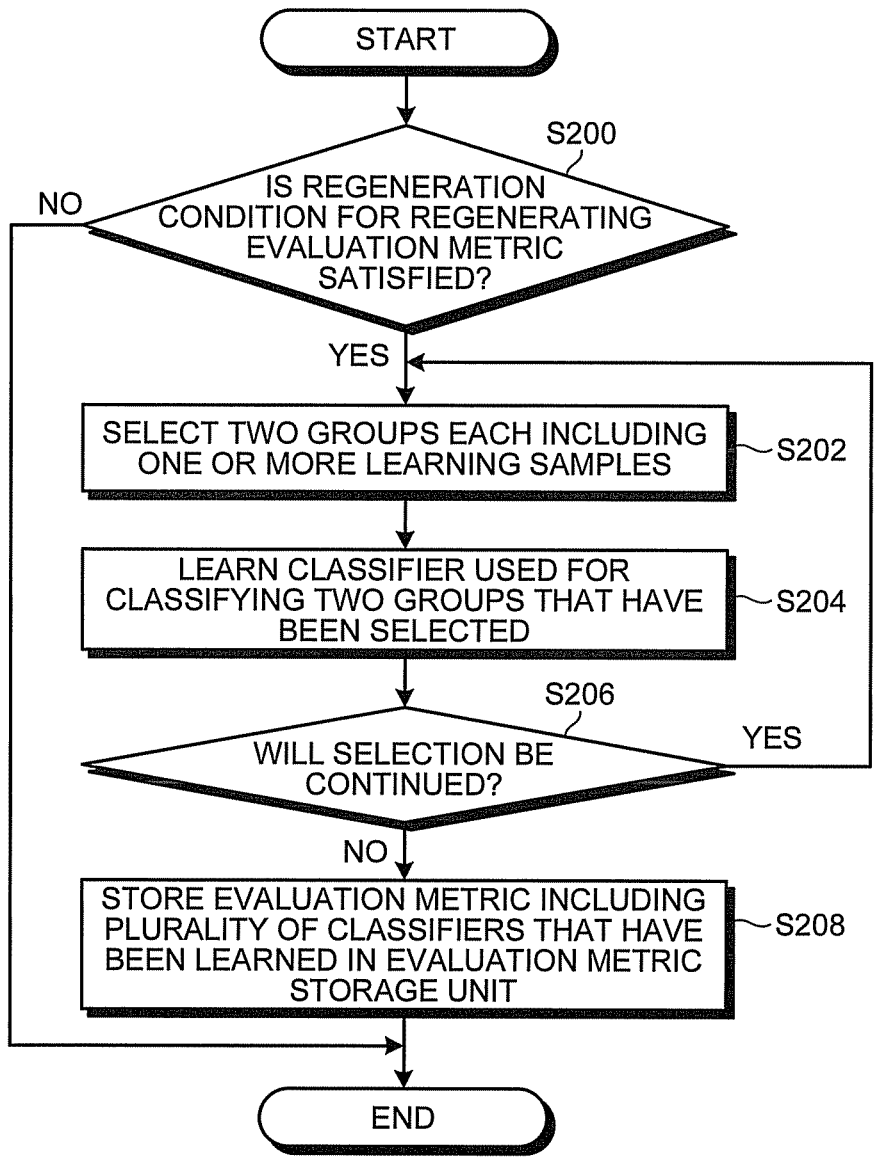

RECOGNITION DEVICE, RECOGNITION METHOD, AND COMPUTER PROGRAM PRODUCT

CROSS-REFERENCE TO RELATED APPLICATION(S)

This application is based upon and claims the benefit of priority from Japanese Patent Application No. 2011-067398, filed on Mar. 25, 2011; the entire contents of which are incorporated herein by reference.

FIELD

Embodiments described herein relate generally to a recognition device, a recognition method, and a computer program product.

BACKGROUND

In object (pattern) recognition, there is a method for learning a metric space of learning data having a plurality of learning samples and reducing the dimension thereof. According to this method, a linear transformation matrix is calculated (learned) which is used for performing a transformation such that a distance between learning samples belonging to different categories increases, and the calculated linear transformation matrix is applied to the learning data. In a recognition process, an object as a recognition target is recognized by applying the calculated linear transformation matrix to data of an image including the object as the recognition target or the like.

However, according to a conventional method as described above, it is difficult to acquire high accuracy of recognition in a case where the data of an object as a recognition target has a distribution different from that of learning samples, and the amount of calculation during the learning is large. Accordingly, it is difficult to apply such a conventional technology to a recognition device in which data or learning samples that become a recognition metric of object recognition are sequentially added.

BRIEF DESCRIPTION OF THE DRAWINGS

FIG. 5 is a diagram illustrating an exemplary output screen of a recognition result according to the embodiment;

FIG. 9 is a diagram illustrating an example of a recognition table after additional learning according to the embodiment;

FIG. 10 is a diagram illustrating an exemplary regeneration condition setting screen according to the embodiment;

FIG. 11 is a flowchart illustrating an example of a recognition process according to the embodiment;

FIG. 12 is a flowchart illustrating an example of an evaluation metric generating process according to the embodiment.

DETAILED DESCRIPTION

According to an embodiment, a recognition device includes a generation unit, a first reception unit, an extraction unit, a transformation unit, a calculation unit, an output control unit, a second reception unit, and a registration unit. The generation unit is configured to perform, plural times, a selection process of selecting a plurality of groups each including one or more learning samples from a learning sample storage unit that stores therein a plurality of learning samples that are classified into a plurality of categories, learn a classification metric for classifying the plurality of groups selected in each selection process, and perform a generation process of generating an evaluation metric including the learned classification metrics. The first reception unit is configured to receive an image including an object as a recognition target. The extraction unit is configured to extract a first feature value representing an image feature of the image. The transformation unit is configured to transform the first feature value into a second feature value using the evaluation metric. The calculation unit is configured to calculate, by referring to a recognition table stored in a recognition table storage unit in which a plurality of reference feature values as recognition metrics and categories are associated with each other, similarity of the object to each category included in the recognition table using the second feature value and the plurality of reference features. The output control unit is configured to output the similarity of the object to each category included in the recognition table to an output unit as a result of recognition. The second reception unit is configured to receive a category of the object. The registration unit is configured to register the second feature value as the reference feature value in the recognition table with being associated with the category of the object and register the first feature value as the learning sample belonging to the category of the object in the learning sample storage unit. The generation unit performs the generation process again in a case where a predetermined condition is satisfied.

Figure 1:
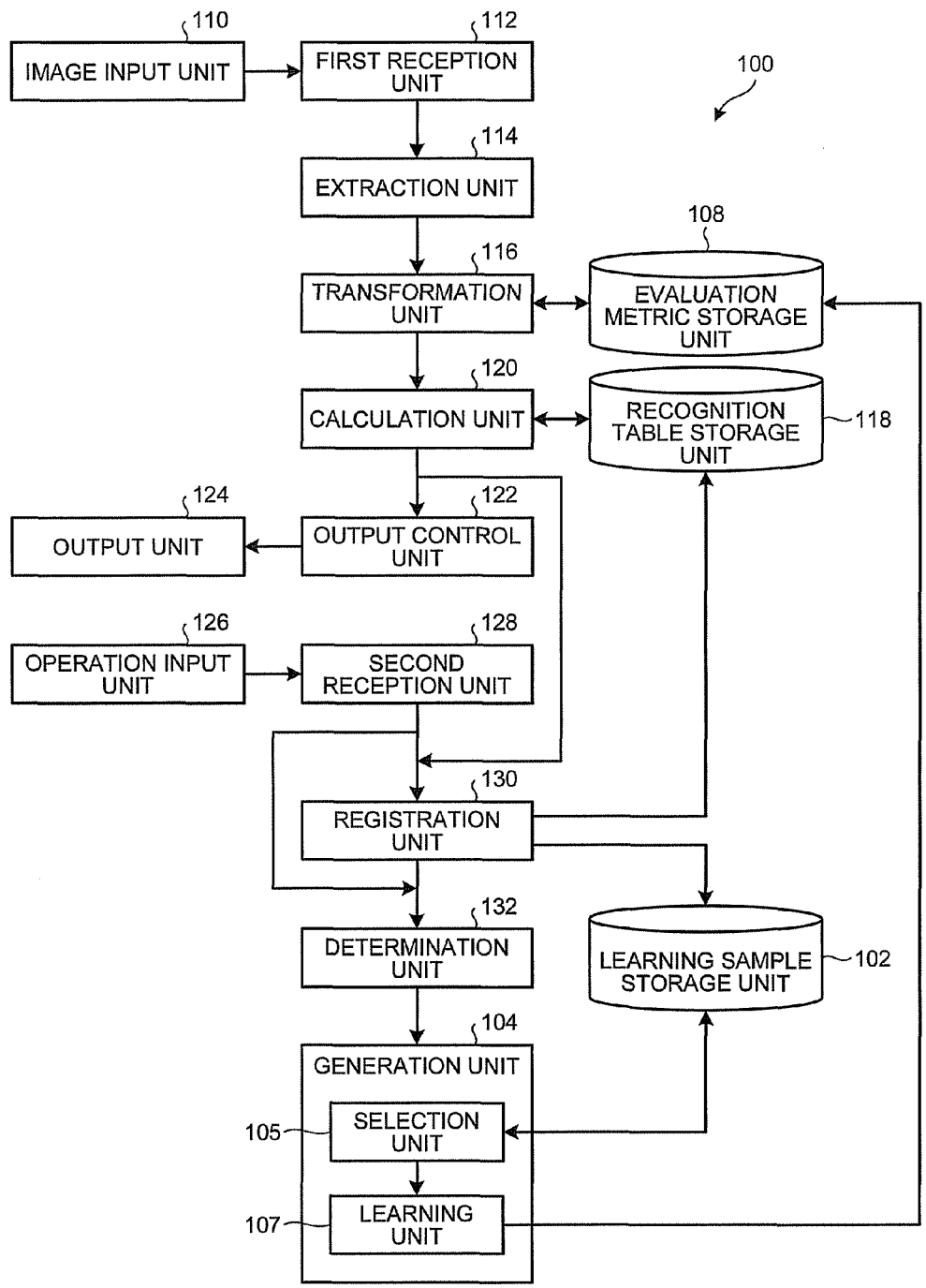
FIG. 1 is a block diagram illustrating a configuration example of a recognition device according to an embodiment.

FIG. 1 is a block diagram illustrating a configuration example of a recognition device 100 according to an embodiment. As illustrated in FIG. 1, the recognition device 100 includes: a learning sample storage unit 102; a generation unit 104; an evaluation metric storage unit 108; an image input unit 110; a first reception unit 112; an extraction unit 114; a transformation unit 116; a recognition table storage unit 118; a calculation unit 120; an output control unit 122; an output unit 124; an operation input unit 126; a second reception unit 128; a registration unit 130; and a determination unit 132.

The learning sample storage unit 102, the evaluation metric storage unit 108, and the recognition table storage unit 118 can be realized by at least one of the existing storage devices that can magnetically, optically, or electrically store therein data, such as a hard disk drive (HDD), a solid state drive (SSD), a memory card. In addition, the generation unit 104, the first reception unit 112, the extraction unit 114, the transformation unit 116, the calculation unit 120, the output control unit 122, the second reception unit 128, the registration unit 130, and the determination unit 132 can be realized by an existing control device such as a central processing units (CPU). Furthermore, the image input unit 110 can be realized by an imaging device such a digital camera, an image input interface that receives an input by reading in an image that has been photographed, or the like. The output unit 124 can be realized by an existing display device such as a liquid crystal display. In addition, the operation input unit 126 can be realized by at least one of existing input devices such as a mouse, a keyboard, and a touch panel.

The learning sample storage unit 102 stores therein a plurality of learning samples that are classified into a plurality of categories. In this embodiment, although each learning sample includes: a feature vector that represents the image features of an image; and category information that represents a category to which the feature vector (learning sample) belongs, the embodiment is not limited thereto.

In this embodiment, the learning sample storage unit 102 stores therein M (M≥2) learning samples. Here, it is assumed that the number of categories to which learning samples belong is T (T≥2), and the number of learning samples belonging to category h (1≤h≤T) is $M_h$. Accordingly, $M = M_1 + \ldots + M_T$ is established. Here, the category represents the type of object that is used when an object is to be identified (classified). In other words, a total of three types of objects, i.e., types α, β, and γ is included in M learning samples, T is 3.

The generation unit 104 performs, plural times, a selection process of selecting a plurality of groups each including one or more learning samples from the learning sample storage unit 102, learns a classification metric for classifying the plurality of groups selected in each selection process, and performs a generation process of generating an evaluation metric including the learned classification metrics. In addition, when a predetermined condition is satisfied, the generation unit 104 performs the generation process again. In other words, the generation unit 104 regenerates (re-learns) the evaluation metric. Described in more detail, in a case where a regeneration condition for the evaluation metric is determined to be satisfied by the determination unit 132 which will be described later, the generation unit 104 performs the generation process again. The generation unit 104 includes a selection unit 105 and a learning unit 107.

The selection unit 105 performs the selection process of selecting a plurality of groups each including one or more learning samples from the learning sample storage unit 102 a plurality of times. Particularly, the selection unit 105 selects the plurality of groups such that the numbers of categories of the learning samples or the numbers of samples included in the plurality of selected groups are approximately equal to each other. Described in more detail, the selection unit 105 selects the plurality of groups in such a manner that a difference between the numbers of categories of the learning samples or the numbers of samples included in the selected plurality of groups is within a predetermined range. In addition, in this embodiment, the selection unit 105 randomly selects (random extraction method) learning samples from the learning sample storage unit 102. In this way, it is expected that the categories of the learning samples included in the plurality of groups selected by the selection unit 105 will be different in each selection process of the selection unit 105. However, the method of selecting the learning samples is not limited thereto, but the learning samples may be selected on the basis of any selection standard as long as the categories of the learning samples included in the plurality of selected groups can be expected to be different in each selection process.

In this embodiment, the selection unit 105 performs, N (N≥2) times, a selection process of randomly selecting K (K=2) groups from the learning sample storage unit 102 such that each group includes one or more learning samples. Particularly, in the selection process, the selection unit 105 randomly selects K groups such that the K groups have the same number of categories of learning samples. Here, the value of K may be two or more.

Accordingly, instead of randomly selecting all learning samples from the learning sample storage unit 102, the selection unit 105 may perform weighting in accordance with the number of learning samples for the categories such that the difference between the numbers of learning samples in the K groups is reduced, or may extract a constant number of learning samples regardless of the numbers of learning samples of the categories. When the number of learning samples is constant, the selection unit 105 may simply randomly select learning samples from the category or may preferentially select the learning samples that have not been selected from the category.

The learning unit 107 learns a classification metric for classifying the plurality of groups selected in each selection process performed by the selection unit 105, and generates an evaluation metric including a plurality of classification metrics that have been learned. In this embodiment, the learning unit 107 learns a classifier $F_i(x)$ (1≤i≤N) used for classifying the K groups selected in each selection process performed by the selection unit 105 and generates an evaluation metric $\{F_1(x), F_2(x), \ldots, F_N(x)\}$ including the N classifiers that have been learned.

The evaluation metric $\{F_1(x), F_2(x), \ldots, F_N(x)\}$ generated by the learning unit 107 is used for recognizing an object that is included in an image. Described in more detail, each of the N classifiers $F_i(x)$ included in the evaluation metric $\{F_1(x), F_2(x), \ldots, F_N(x)\}$ outputs an evaluation value for an image as a recognition target. The evaluation value corresponds to, for example, likelihood, a group number, or the like representing that the image as a recognition target belongs to which group, which is learned by the classifier in advance. Then, a plurality of the evaluation values that are output is used as a recognition feature value of the object included in the image. In this way, the evaluation value is used for recognition of an object.

In this embodiment, the learning unit 107 learns the classifier $F_i(x)$ for classifying the K groups by using a support vector machine. The support vector machine is a method for configuring two-class pattern classifiers. The learning is performed by acquiring a hyperplane that maximizes a distance to data points, i.e., the maximum soft margin hyperplane. However, the learning method of the classifier is not limited thereto, and a known learning method may be used. For example, the learning unit 107 may use a known learning method such as boosting. For example, when a classifier used for classifying three groups selected by the selection unit 105 is learned, the learning unit 107 can use a learning method such as a k-nearest neighbor classifier, Bayesian classification, or a neural network.

Figures 2, 3, 4:
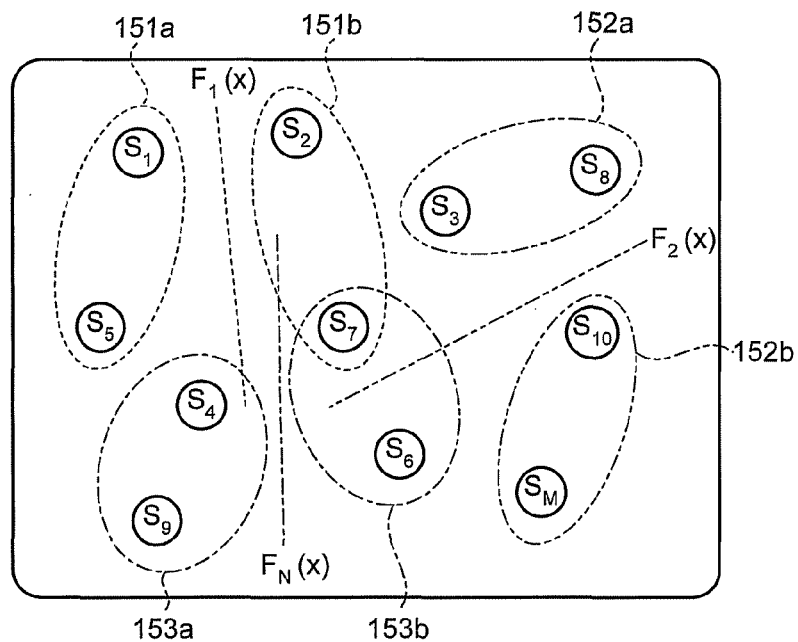
FIG. 2 is a schematic diagram illustrating an example of the method for generating an evaluation metric according to the embodiment.
FIG. 3 is a schematic diagram illustrating an exemplary method for calculating a recognition feature value according to the embodiment.
FIG. 4 is a diagram illustrating an example of a recognition table according to the embodiment.

FIG. 2 is a schematic diagram illustrating an example of the method for generating an evaluation metric. In the example illustrated in FIG. 2, $S_1$ to $S_M$ (M≥11) represent learning samples (feature values), and it is assumed that T is M. In other words, in the example illustrated in FIG. 2, it is assumed that the categories of all the learning samples are different from one another. In addition, in the example illustrated in FIG. 2, it is assumed that K is 2. In other words, in the example illustrated in FIG. 2, the selection unit 105 selects two groups such that the number of categories of the learning samples included in each group is 2, that is, such that the number of learning samples included in each group is 2 since T is equal to M.

In the example illustrated in FIG. 2, the selection unit 105 selects a group 151a that includes learning samples $S_1$ and $S_5$ and a group 151b that includes learning samples $S_2$ and $S_7$ in a first selection process. In addition, the selection unit 105 selects a group 152a that includes learning samples $S_3$ and $S_8$ and a group 152b that includes learning samples $S_{10}$ and $S_M$ in a second selection process. Furthermore, the selection unit 105 selects a group 153a that includes learning samples $S_4$ and $S_9$ and a group 153b that includes learning samples $S_6$ and $S_7$ in an N-th selection process.

In addition, the learning unit 107 learns the classifier $F_1(x)$ that is used for classifying the group 151a and the group 151b that are selected in the first selection process by the selection unit 105. Furthermore, the learning unit 107 learns the classifier $F_2(x)$ that is used for classifying the group 152a and the group 152b that are selected in the second selection process by the selection unit 105. In addition, the learning unit 107 learns the classifier $F_N(x)$ that is used for classifying the group 153a and the group 153b that are selected in the N-th selection process by the selection unit 105. In this way, the learning unit 107 generates a classifier group $\{F_1(x), F_2(x), \ldots, F_N(x)\}$ that includes N classifiers that have been learned.

In the evaluation metric storage unit 108, the evaluation metric generated by the generation unit 104 is stored. Described in more detail, the generation unit 104 (the learning unit 107) stores the generated evaluation metric $\{F_1(x), F_2(x), \ldots, F_N(x)\}$ in the evaluation metric storage unit 108. In addition, when the evaluation metric has already been stored in the evaluation metric storage unit 108, in other words, when the evaluation metric is re-learned, the generation unit 104 may replace all or some of the classifiers $F_i(x)$ included in the evaluation metric. For example, when the number of classifiers to be replaced is L (L<N), the generation unit 104 may replace only the classifiers $F_1(x)$ to $F_L(x)$ through re-learning and maintain the classifiers $F_{L+1}(x)$ to $F_N(x)$ that have been previously learned. In such a case, even when there is a deviation in the distribution of the learning samples in accordance with additional learning, the influence thereof can be reduced.

The image input unit 110 inputs an image that includes an object as a recognition target. The first reception unit 112 receives the image input from the image input unit 110.

The extraction unit 114 extracts a first feature value that represents the image features of the image received by the first reception unit 112. In this embodiment, the extraction unit 114 extracts a feature vector that represents the image features of the image from the image received by the first reception unit 112. For example, the extraction unit 114 extracts, as the feature vector, at least one of a vector based on a co-occurrence frequency in the luminance gradient direction, a vector based on a co-occurrence frequency of an edge orientation and the change of colors across the edge, a vector based on the frequency of a color change, and a vector based on the frequency of a color.

The transformation unit 116 transforms the first feature value extracted by the extraction unit 114 into a second feature value by using the evaluation metric that is stored in the evaluation metric storage unit 108. In this embodiment, the transformation unit 116 transforms the feature vector extracted by the extraction unit 114 into a recognition feature value used for object recognition by using the evaluation metric $\{F_1(x), F_2(x), \ldots, F_N(x)\}$.

In this embodiment, it is assumed that each of the classifiers $F_i(x)$ included in the evaluation metric $\{F_1(x), F_2(x), \ldots, F_N(x)\}$ returns an evaluation value $s_i$ for a feature vector X, as represented by Expression (1). Here, even when the learning unit 107 learns the classifiers $F_i(x)$ using any learning method, the output of the classifier $F_i(x)$ is represented as, for example, likelihood belonging to a group to be classified and satisfies the following Expression (1).

$$F_i(X)=s_i \tag{1}$$

In this embodiment, an example in which the evaluation value $s_i$ is a scalar will be described, but the embodiment is not limited thereto. For example, the evaluation value $s_i$ may be a vector having a plurality of elements. In addition, the following description may be similarly applied to an example in which the evaluation value $s_i$ is a vector. For example, when the learning unit 107 learns the classifiers $F_i(x)$ using a learning method in which three or more groups are classified, the output of the classifiers $F_i(x)$ is a vector having likelihood belonging to each group to be classified as an element.

FIG. 3 is a schematic diagram illustrating an exemplary method for calculating a recognition feature value v(X). The transformation unit 116, as illustrated in FIG. 3, applies the feature vector X extracted by the extraction unit 114 to the evaluation metric $\{F_1(x), F_2(x), \ldots, F_N(x)\}$ to acquire the evaluation value $s_i$ from each classifier $F_i(x)$ and transforms the feature vector X into the recognition feature value v(X) using the acquired evaluation values $s_i$. In this embodiment, the transformation unit 116, as illustrated in FIG. 3 and Expression (2), lines up all the evaluation values $s_i$ into one to transform the feature vector X into the recognition feature value v(X).

$$v(X)=(s_1, s_2, \ldots, s_N) \tag{2}$$

For example, it is assumed that when the classifiers $F_i(x)$ classify two classes, the feature value v(X) is a function that outputs a real number in the range of "0" to "1" as the evaluation value $s_i$. In this case, the transformation unit 116 calculates the recognition feature value of the feature vector X extracted by the extraction unit 114, for example, as a vector represented as a combination of real numbers, such as v(X)=(0.5, 0.4, 0.9, 0.7, 1.0, . . . , 0.1). In addition, the transformation unit 116 calculates the recognition feature value of a feature vector X' (X'≠X) extracted by the extraction unit 114 as a vector represented by a combination of real numbers, such as v(X')=(0.1, 0.9, 0.0, 0.2, 0.3, . . . , 0.8). The calculated recognition feature value is different from that of the feature vector X. In other words, in this example, the vector represented by a combination of real numbers is the unique recognition feature value of the object included in the image and is a recognition feature value that is effective for recognizing the object.

However, a method of calculating the recognition feature value is not limited to the above-described method, but the recognition feature value may be calculated using the acquired evaluation value $s_i$ in any way.

When the evaluation value $s_i$ is a vector, the recognition feature value v(X) of the feature vector X is an array of the elements of the evaluation value $s_i$. In other words, when the dimension number of the evaluation value $S_i$ is $d_i$, the dimension number D of the recognition feature value v(X) of the feature vector X is the total sum of the dimension numbers $d_i$ (D=$d_1$+ . . . +$d_N$). Here, the dimension numbers di of the evaluation values $s_i$ may be equal to or different from each other.

The recognition table storage unit 118 stores therein a recognition table (dictionary database) in which a plurality of reference feature values that become recognition metrics is associated with categories. FIG. 4 is a diagram illustrating an example of a recognition table. In the example illustrated in FIG. 4, a reference feature value ($a_{11}, a_{12}, \ldots, a_{1N}$) and a reference feature value ($a_{21}, a_{22}, \ldots, a_{2N}$) that become recognition metrics for determining whether a feature value belongs to category A are associated with category A, and a reference feature value ($b_{11}, b_{12}, \ldots, b_{1N}$) that becomes a recognition metric for determining whether a feature value belongs to category B is associated with category B.

The calculation unit 120 refers to the recognition table stored in the recognition table storage unit 118 and calculates similarities of an object as a recognition target, which is included in the image received by the first reception unit 112, to the categories included in the recognition table by using the second feature value transformed by the transformation unit 116 and the plurality of reference feature values.

In this embodiment, the calculation unit 120 acquires, from the recognition table, k reference feature values that are close to the recognition feature value v(X) transformed by the transformation unit 116 using a k-nearest neighbor algorithm and calculates, as the similarity of the object as the recognition target to each category included in the recognition table, the ratio of each category to which the acquired k reference feature values belong. For example, it is assumed that k is three, and, out of the three reference feature values acquired by the calculation unit 120 using the k-nearest neighbor algorithm, there are two reference feature values that belong to category A, and there is one feature value that belongs to category B. In such a case, the calculation unit 120 calculates the similarity of category A as 0.67 ($\approx 2/3$), the similarly of category B as 0.33 ($\approx 1/3$), and the similarity of the other categories as zero.

In addition, the calculation unit 120 may calculate the similarity of an object to each category by using a general pattern recognition method such as a support vector machine, a subspace method, a neural network, a kernel method, a random forest, or boosting.

Figure 6:
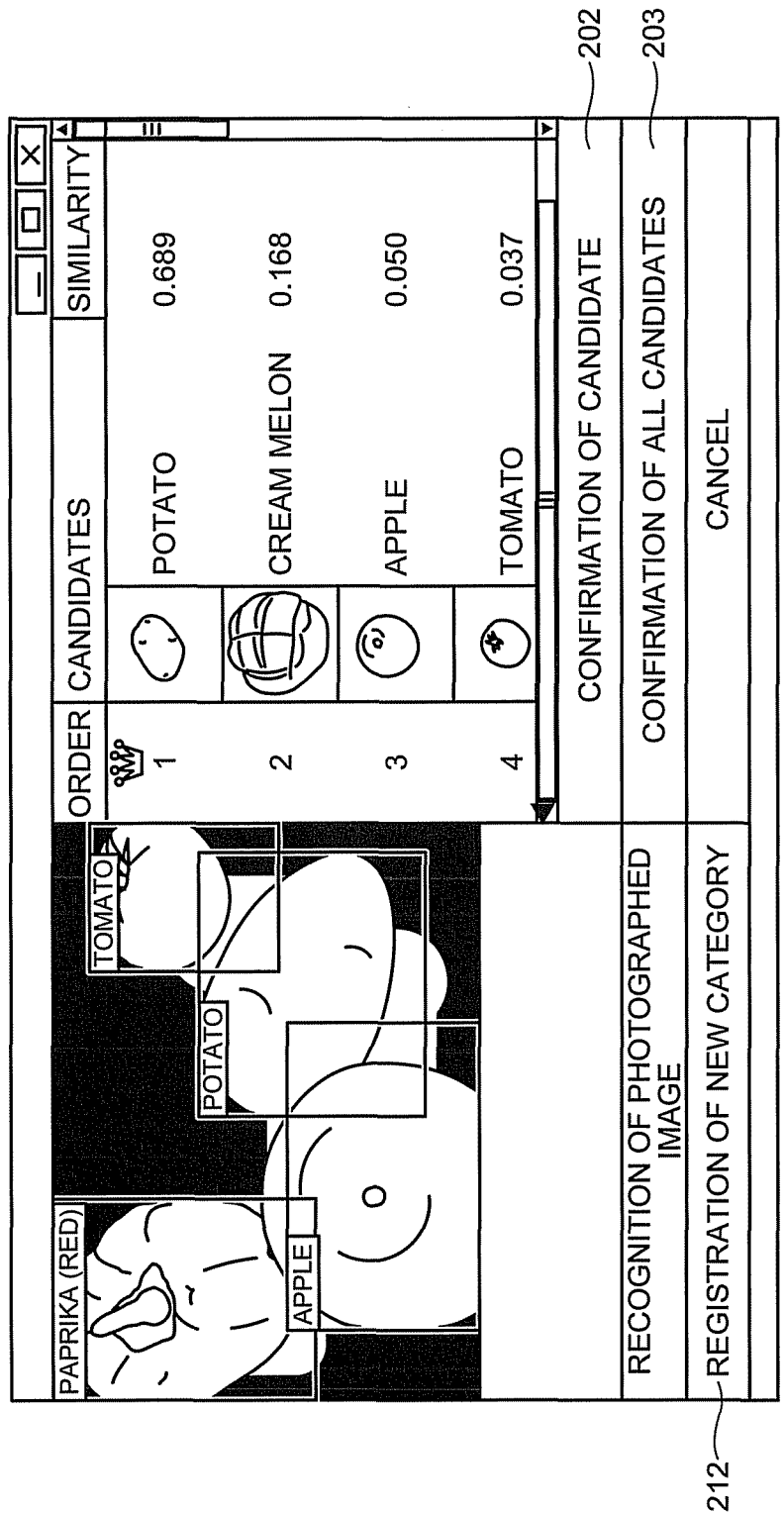
FIG. 6 is a diagram illustrating an exemplary output screen of a recognition result according to the embodiment.

The output control unit 122 outputs the similarities of the object as the recognition target to the categories included in the recognition table, which are calculated by the calculation unit 120, to the output unit 124 as a recognition result. In this embodiment, the output control unit 122 sorts the categories included the recognition table in the descending order of the similarity to the object as the recognition target and outputs the categories to the output unit 124. FIG. 5 is a diagram illustrating an exemplary output screen of the recognition result. In the example illustrated in FIG. 5, the similarity of category "Donut" to the object as the recognition target is 1.000, and the similarity of other categories to the above-described object is 0.000. Accordingly, the output control unit 122 sorts the categories so as to allow the category "Donut" to be disposed on the top and outputs an output screen of the recognition result to the output unit 124. In addition, as illustrated in FIG. 6, in a case where a plurality of objects as recognition targets is included in an image input by the image input unit 110, and the similarities of each object to the categories included in the recognition table are calculated by the calculation unit 120, the output control unit 122 outputs the recognition result for each object to the output unit 124.

The output control unit 122 may be configured to output, out of the categories included in the recognition table to the output unit 124, a predetermined number of categories having a high level of similarity to the object as the recognition target in the descending order of the similarity, or alternatively, may be configured to output, out of the categories included in the recognition table to the output unit 124, categories having a level of similarity to the object as the recognition target higher than a threshold value.

The output unit 124 outputs the recognition result under the control of the output control unit 122.

The operation input unit 126 performs various operation inputs for the recognition device 100. The operation input unit 126, for example, inputs a category of an object as a recognition target that is included in the image input by the image input unit 110.

Figure 7:
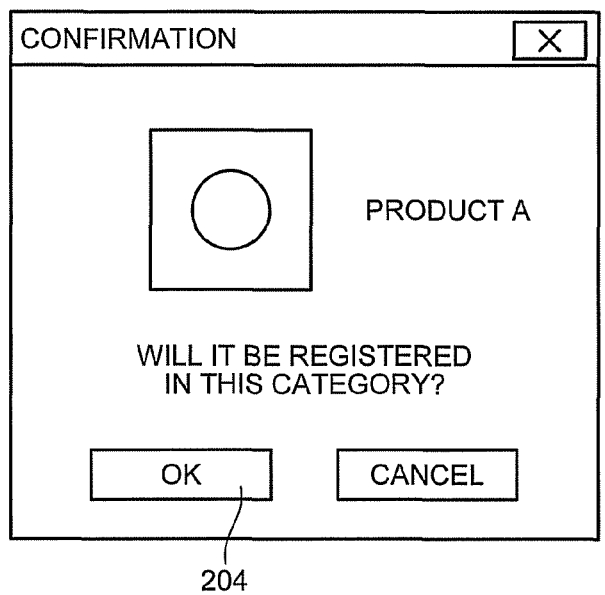
FIG. 7 is a diagram illustrating an exemplary confirmation screen according to the embodiment.

In this embodiment, when a user selects a confirmation button 201 on the screen illustrated in FIG. 5 or a confirmation button 202 or 203 on the screen illustrated in FIG. 6 by using the operation input unit 126, a confirmation screen (confirmation dialogue) as illustrated in FIG. 7 is output to the output unit 124 by the output control unit 122. The confirmation screen illustrated in FIG. 7 is a screen that is used for confirming (inputting) the category, which is included in the recognition table, having a highest level of similarity to the object as the recognition target out of the recognition result output by the output control unit 122 as the category of the object as the recognition target. In this case, the user confirms the category of the object as the recognition target by selecting an OK button 204 on the screen illustrated in FIG. 7 by using the operation input unit 126.

Figure 8:
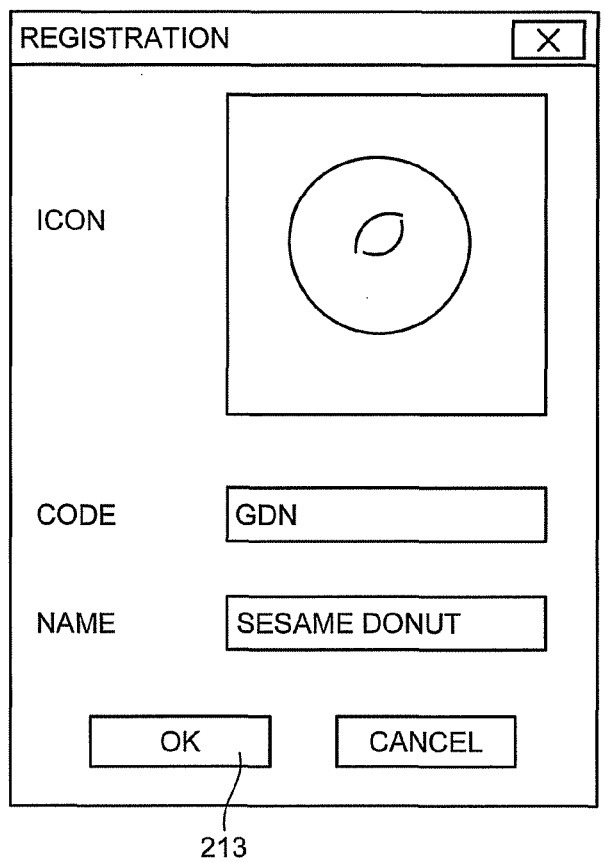
FIG. 8 is a diagram illustrating an exemplary registration screen according to the embodiment.

In this embodiment, when a user selects a registration button 211 on the screen illustrated in FIG. 5 or a registration button 212 on the screen illustrated in FIG. 6 by using the operation input unit 126, a registration screen (registration dialogue) as illustrated in FIG. 8 is output to the output unit 124 by the output control unit 122. The registration screen illustrated in FIG. 8 is a screen that is used for newly registering (inputting) a category of the object as the recognition target. In this case, by inputting the name and the code of the new category and selecting an OK button 213 on the screen illustrated in FIG. 8 by using the operation input unit 126, the user registers the category of the object as the recognition target.

In addition, the operation input unit 126, for example, performs an input for instructing re-generation (re-learning) of the evaluation metric.

The second reception unit 128 receives various operation inputs such as an instruction for registering a category or regenerating the evaluation metric that is input from the operation input unit 126.

The registration unit 130 registers the second feature value transformed by the transformation unit 116 as a reference feature value in the recognition table with being associated with a category that is received by the second reception unit 128. In addition, the registration unit 130 registers the first feature value extracted by the extraction unit 114 in the learning sample storage unit 102 as a learning sample belonging to the category received by the second reception unit 128. In other words, the registration unit 130 additionally learns the recognition table and the learning sample.

For example, it is assumed that the recognition feature value transformed by the transformation unit 116 is ($c_{11}, c_{12}, \ldots, c_{1N}$) and the category received by the second reception unit 128 is category C. In such a case, the registration unit 130 registers the recognition feature value ($c_{11}, c_{12}, \ldots, c_{1N}$) in the recognition table as the reference feature value ($c_{11}, c_{12}, \ldots, c_{1N}$) with being associated with category C. FIG. 9 is a diagram illustrating an example of a recognition table after additional learning. In the example illustrated in FIG. 9, a combination of a reference feature value ($c_{11}, c_{12}, \ldots, c_{1N}$) and category C is additionally learned from the recognition table illustrated in FIG. 4. In addition, the registration unit 130 registers a learning sample that includes a feature vector before transformation into the recognition feature value ($c_{11}, c_{12}, \ldots, c_{1N}$) through the transformation unit 116 and category information representing category C in the learning sample storage unit 102.

In addition, in a case where the category received by the second reception unit 128 is in a state of being already been registered in the recognition table, the registration unit 130 registers the second feature value transformed by the transformation unit 116 as the reference feature value in the recognition table with being associated with the category that has been registered. The registration unit 130 may delete or update the combination of the reference feature value and the category that has been registered at the time of additional learning of the recognition table or delete or update the learning sample that has been registered at the time of additional learning of the learning sample.

The determination unit 132 determines whether or not the condition for regenerating the evaluation metric is satisfied. In this embodiment, the determination unit 132 counts the number of registrations of the registration table and the learning sample through the registration unit 130 after the generation (learning) or regeneration (relearning) of the evaluation metric through the generation unit 104 and determines whether or not the number of registrations has exceeded a predetermined number. In addition, the determination unit 132 determines whether or not an input of the instruction for regeneration of the evaluation metric has been received by the second reception unit 128. Then, by the determination unit 132, in a case where the number of registrations of the recognition table and the learning sample through the registration unit 130 is determined to have exceeded the predetermined number or the input of the instruction for regeneration of the evaluation metric is determined to have been received by the second reception unit 128, the generation unit 104 performs the process of generating the evaluation metric again, and thereby relearning the evaluation metric.

In this embodiment, an example in which the regeneration conditions are the number of registrations through the registration unit 130 after the process of generating the evaluation metric (learning or relearning of the evaluation metric) and the presence of a regeneration instruction used for instructing the regeneration has been described, but the regeneration conditions are not limited thereto. For example, the regeneration condition may be a time that has elapsed after the process of generating the evaluation metric (the learning or relearning of the evaluation metric), a recognition error rate, the number of reference feature values, the variance (distribution) of the reference feature values, the number of learning samples, the variance (distribution) of learning samples, or the like.

In a case where the regeneration condition is the time that has elapsed after the process of generating the evaluation metric, the determination unit 132 may measure a time that has elapsed after the generation or regeneration of the evaluation metric through the generation unit 104 and determine whether or not the measured time exceeds a predetermined time. In a case where the regeneration condition is the recognition error rate, the determination unit 132 may acquire a recognition error rate based on the category having the highest similarity calculated by the calculation unit 120 and the category received by the second reception unit 128 and determine whether or not the acquired recognition error rate exceeds a predetermined recognition error rate. In a case where the regeneration condition is the number of reference feature values, the determination unit 132 may count the number of reference feature values included in the recognition table and determine whether or not the counted number exceeds the predetermined number of reference feature values. In a case where the regeneration condition is the variance of the reference feature values, the determination unit 132 may calculate the variance of the reference feature values included in the recognition table and determine whether or not the variance is within a predetermined range. In a case where the regeneration condition is the number of learning samples, the determination unit 132 may count the number of learning samples stored in the learning sample storage unit 102 and determines whether or not the counted number exceeds the predetermined number of learning samples. In a case where the regeneration condition is the variance of learning samples, the determination unit 132 may calculate the variance of the learning samples stored in the learning sample storage unit 102 and determine whether or not the calculated variance is within a predetermined range set in advance.

Furthermore, the condition for regenerating the evaluation metric may be set through a regeneration condition setting screen as illustrated in FIG. 10. For example, the output control unit 122 outputs the regeneration condition setting screen as illustrated in FIG. 10 to the output unit 124, a user inputs items set as the regeneration conditions and predetermined values of the items and selects an OK button 221 on the screen as illustrated in FIG. 10 by using the operation input unit 126, and the second reception unit 128 receives the inputs. Then, the determination unit 132 performs determination based on the items set as the regeneration conditions and the predetermined values of the items that are received by the second reception unit 128.

FIG. 11 is a flowchart illustrating an exemplary flow of the procedure of the recognition process that is performed by the recognition device 100 according to this embodiment.

First, the first reception unit 112 receives an input of an image that includes an object as a recognition target from the image input unit 110 in Step S100.

Subsequently, the extraction unit 114 extracts a feature vector that represents image features of the image from the image received by the first reception unit 112 in Step S102.

Subsequently, the transformation unit 116 transforms the feature vector extracted by the extraction unit 114 into a recognition feature value used for object recognition by using the evaluation metric $\{F_1(x), F_2(x), \ldots, F_N(x)\}$ in Step S104.

Subsequently, the calculation unit 120 refers to the recognition table in which the plurality of reference feature values is associated with categories and calculates the similarity of the object as the recognition target to each category included in the recognition table in Step S106 by using the recognition feature value transformed by the transformation unit 116 and the plurality of reference feature values.

Subsequently, the output control unit 122 outputs the similarity of the object to each category included in the recognition table that is calculated by the calculation unit 120 to the output unit 124 as the recognition result in Step S108.

Subsequently, the second reception unit 128 receives an input of the category of the object as the recognition target from the operation input unit 126 in Step S110.

Subsequently, the registration unit 130 sets the recognition feature value transformed by the transformation unit 116 as the reference feature value and registers the recognition feature value in the recognition table with being associated with the category received by the second reception unit 128 in Step S112.

Subsequently, the registration unit 130 registers the feature vector extracted by the extraction unit 114 in the learning sample storage unit 102 as a learning sample belonging to the category received by the second reception unit 128 in Step S114.

FIG. 12 is a flowchart illustrating an exemplary flow of the procedure of an evaluation metric generating process that is performed by the recognition device 100 according to this embodiment.

First, the determination unit 132 determines whether or not the condition for regenerating an evaluation metric is satisfied in Step S200.

When the condition for regenerating the evaluation metric is determined to be satisfied by the determination unit 132 (Yes in Step S200), the selection unit 105 selects two groups each including one or more learning samples from the learning sample storage unit 102 in Step S202. At this time, the selection unit 105 selects the two groups in such a manner that a difference in the numbers of categories of learning samples included in the selected two groups between the groups is within a predetermined range. On the other hand, when the condition for regenerating the evaluation metric is determined not to be satisfied by the determination unit 132 (No in Step S200), the process ends.

Subsequently, the learning unit 107 learns classifiers for classifying the two groups selected by the selection unit 105 in Step S204.

Subsequently, for example, when the selection has not been performed N times, the selection unit 105 determines to continue the selection (Yes in Step S206), and the process is returned to Step S202. On the other hand, when the selection has been performed N times, the selection unit 105 determines not to continue the selection (No in Step S206), and the process proceeds to Step S208.

Subsequently, the learning unit 107 generates an evaluation metric including a plurality of the classifiers learned in Step S204 and stores the evaluation metric in the evaluation metric storage unit 108 in Step S208.

Figure 13:
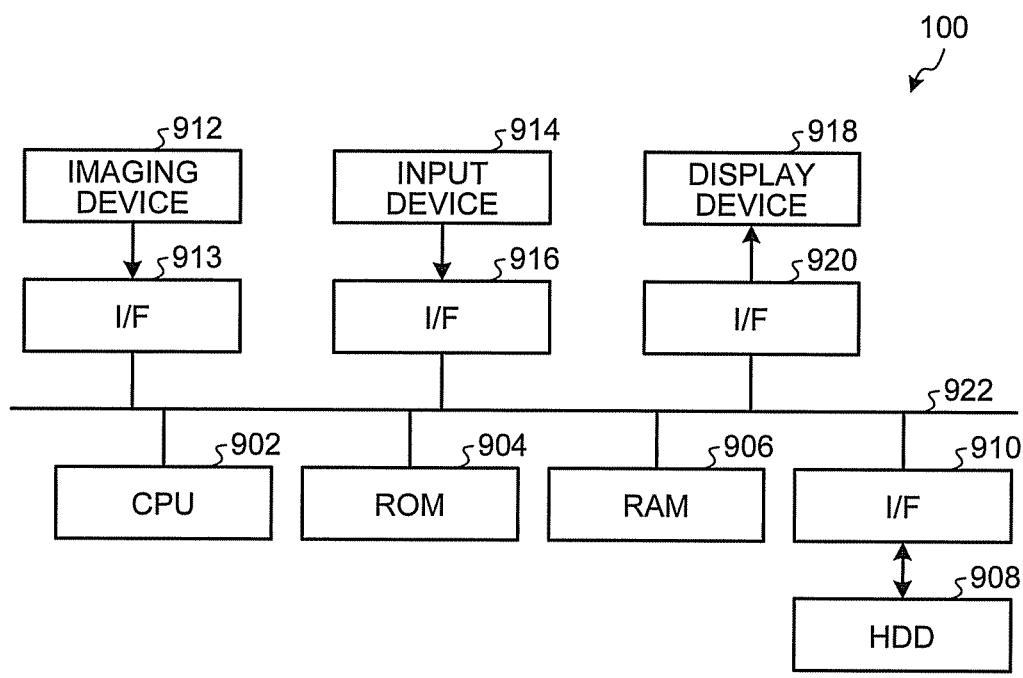
FIG. 13 is a block diagram illustrating an example of the hardware configuration of a recognition device according to the embodiment.

FIG. 13 is a block diagram illustrating an example of the hardware configuration of the recognition device 100 according to this embodiment. As illustrated in FIG. 13, the recognition device 100 according to this embodiment includes: a CPU 902; a ROM 904 that stores a recognition program (learning program) used for generating an evaluation metric or recognizing an object included in image data or the like; a RAM 906; an HDD 908 that stores a learning sample, an evaluation metric, a recognition table, and the like; an I/F 910 that is an interface for the HDD 908; an imaging device 912 such as a digital camera; an I/F 913 that is an interface for inputting an image; an input device 914 such as a mouse or a keyboard; an I/F 916 that is an interface for the input device 914; a display device 918 such as a display; an I/F 920 that is an interface for the display device 918; and a bus 922 and has a hardware configuration using an ordinary computer. In addition, the CPU 902; the ROM 904; the RAM 906; the I/F 910; the I/F 913, the I/F 916; and the I/F 920 are interconnected through the bus 922.

In the recognition device 100 according to this embodiment, the CPU 902 reads out a recognition program from the ROM 904 to store the recognition program in the RAM 906 and executes the recognition program, whereby each of the above-described units is realized in the computer. In the recognition device 100 according to this embodiment, the CPU 902 generates an evaluation metric by using learning samples stored in the HDD 908, stores the evaluation metric in the HDD 908, and recognizes an object included in an image that is input from the I/F 913 by using the evaluation metric, the recognition table, or the like that is stored in the HDD 908.

Alternatively, the recognition program may be stored in the HDD 908. Furthermore, the recognition program may be stored on a computer-readable storage medium such as a CD-ROM, a CD-R, a memory card, a DVD, or a flexible disk (FD) in an installable format or an executable format and be provided as a computer program product. In addition, the recognition program may be stored in a computer connected to a network such as the Internet and be provided by being downloaded via the network. Furthermore, the recognition program may be configured to be provided or distributed via a network such as the Internet. In addition, it may be configured such that an image including an object as a recognition target is stored in the HDD 908, and an image is input from the I/F 910.

As described above, in the recognition device according to this embodiment, the evaluation metric is generated by learning, for each of the plurality of groups, classifiers used for classifying a plurality of groups, that is, classifiers used for classifying the categories or combinations of categories of learning samples included in each group. Accordingly, the generated evaluation metric is effective not only for recognition of a specific category but has a high degree of general versatility. Thus, in the recognition device according to this embodiment, since the recognition feature value of an object as a recognition target is acquired by using the evaluation metric having a high degree of general versatility, the feature value has superior recognition accuracy even in a case where a feature vector of the image data including the object as the recognition target is away from the distribution of the learning samples.

Here, in an additional learning-type recognition device that recognizes an object as a recognition target and updates the recognition table and the learning samples, in a case where the general versatility of the evaluation metric is low, a decrease in the recognition performance accompanied with additional learning increases. Thus, in a case where the general versatility of the evaluation metric is low, relearning of the evaluation metric at a high frequency is necessary to avoid the decrease in the recognition performance. Therefore, the processing load accompanied with the relearning of the evaluation metric requires a quite long time, whereby the processing efficiency of the additional learning-type object recognition is lowered.

In contrast to this, like the recognition device according to this embodiment, in a case where the general versatility of the evaluation metric is high, a decrease in the recognition performance accompanied with additional learning is small, and accordingly, the frequency of relearning of the evaluation metric accompanied with the additional learning can be decreased, whereby the additional learning-type object recognition can be efficiently performed. Thus, according to the recognition device of this embodiment, the recognition accuracy can be maintained high while the additional learning-type object recognition is efficiently performed.

As described above, according to this embodiment, both the recognition accuracy and the recognition efficiency can be acquired together.

The execution sequence of the steps illustrated in the flowchart according to each embodiment described above may be changed unless contrary to the nature thereof, and the steps may be simultaneously executed or may be executed in a different sequence for each execution.

In addition in the above-described embodiment, although an example has been described in which the recognition device performs both the learning (generation) process and the recognition process, the learning process and the recognition process may be performed by difference devices. For example, it may be configured such that the learning process is performed by a learning device, and the recognition process is performed by the recognition device. In such a case, the evaluation metric generated by the learning device may be stored in the recognition device.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition device comprising:
a generation unit configured to
perform, plural times, a selection process of selecting a plurality of groups each including one or more learning samples from a learning sample storage unit that stores therein a plurality of learning samples that are classified into a plurality of categories,
learn a classification metric, which is a classifier $F_i(x)$ for each group of the plurality of groups for classifying the plurality of groups selected in each selection process, where $1 \le i \le N$, and N is the number of classifiers, and
perform a generation process of generating an evaluation metric that includes the classifier $F_i(x)$ for each group of the plurality of groups, wherein the evaluation metric is defined as $\{F_1(x), F_2(x), \text{through}, F_N(x)\}$, and wherein x is a variable;
a first reception unit configured to receive an image including an object as a recognition target;
an extraction unit configured to extract a first feature value representing an image feature of the image;
a transformation unit configured to transform the first feature value into a second feature value using the evaluation metric;
a calculation unit configured to calculate, by referring to a recognition table stored in a recognition table storage unit in which a plurality of reference feature values, stored as recognition metrics, and categories are associated with each other, similarity of the object to each category included in the recognition table using the second feature value and the plurality of reference features;
an output control unit configured to output the similarity of the object to each category included in the recognition table to an output unit as a result of recognition;
a second reception unit configured to receive a category of the object; and
a registration unit configured to register the second feature value as the reference feature value in the recognition table with being associated with the category of the object and register the first feature value as the learning sample belonging to the category of the object in the learning sample storage unit,
wherein the generation unit performs the generation process again in a case where a predetermined condition is satisfied.

2. The device according to claim 1, further comprising a determination unit configured to determine whether or not the condition for regenerating the evaluation metric is satisfied,
wherein the generation unit performs the generation process again when the condition for regenerating the evaluation metric is satisfied.

3. The device according to claim 2, wherein the condition for regenerating the evaluation metric is at least one of the number of registrations through the registration unit, a time that has passed after the generation process, a recognition error rate, the number of the reference feature values, variance of the reference feature values, the number of the learning samples, variance of the learning samples, and presence of a regeneration instruction that instructs regeneration.

4. The device according to claim 1, wherein the first feature value is at least one of a vector using a co-occurrence frequency in a luminance gradient direction, a vector using a co-occurrence frequency of an edge orientation and the change of colors across the edge, a vector using a frequency of a color change, and a vector using a frequency of a color.

5. The device according to claim 1, wherein the calculation unit calculates the similarity of the object to each category included in the recognition table by using a k-nearest neighbor algorithm.

6. A recognition method comprising:
performing, plural times, a selection process of selecting a plurality of groups each including one or more learning samples from a learning sample storage unit that stores therein a plurality of learning samples that are classified into a plurality of categories;
learning a classification metric, which is a classifier $F_i(x)$ for each group of the plurality of groups for classifying the plurality of groups selected in each selection process, where $1 \le i \le N$, and N is the number of classifiers;
performing a generation process of generating an evaluation metric that includes the classifier $F_i(x)$ for each group of the plurality of groups, wherein the evaluation metric is defined as $\{F_1(x), F_2(x), \text{through}, F_N(x)\}$, and where x is a variable;
receiving an image including an object as a recognition target;
extracting a first feature value representing an image feature of the image;
transforming the first feature value into a second feature value using the evaluation metric;
calculating, by referring to a recognition table stored in a recognition table storage unit in which a plurality of reference feature values, stored as recognition metrics, and categories are associated with each other, similarity of the object to each category included in the recognition table using the second feature value and the plurality of reference feature values;
outputting the similarity of the object to each category included in the recognition table to an output unit as a result of recognition;
receiving a category of the object;
registering the second feature value as the reference feature value in the recognition table with being associated with the category of the object;
registering the first feature value as the learning sample belonging to the category of the object in the learning sample storage unit; and
performing the generation process again in a case where a predetermined condition is satisfied.

7. A computer program product comprising a non-transitory computer-readable storage medium having programmed instructions, wherein the instructions, when executed by a computer, cause the computer to execute:
performing, plural times, a selection process of selecting a plurality of groups each including one or more learning samples from a learning sample storage unit that stores therein a plurality of learning samples that are classified into a plurality of categories;
learning a classification metric, which is a classifier $F_i(x)$ for each group of the plurality of groups for classifying the plurality of groups selected in each selection process, where $1 \le i \le N$, and N is the number of classifiers;
performing a generation process of generating an evaluation metric that includes the classifier $F_i(x)$ for each group of the plurality of groups, wherein the evaluation metric is defined as $\{F_1(x), F_2(x), \text{through}, F_N(x)\}$, and where x is a variable;

receiving an image including an object as a recognition target;

extracting a first feature value representing an image feature of the image;

transforming the first feature value into a second feature value using the evaluation metric;

calculating, by referring to a recognition table stored in a recognition table storage unit in which a plurality of reference feature values, stored as recognition metrics, and categories are associated with each other, similarity of the object to each category included in the recognition table using the second feature value and the plurality of reference feature values;

outputting the similarity of the object to each category included in the recognition table to an output unit as a result of recognition;

receiving a category of the object;

registering the second feature value as the reference feature value in the recognition table with being associated with the category of the object;

registering the first feature value as the learning sample belonging to the category of the object in the learning sample storage unit; and performing the generation process again in a case where a predetermined condition is satisfied.

* * * * *